June 19, 1951  G. W. SCHATZMAN  2,557,147
FENDER AND FENDER SHIELD ASSEMBLY AND MEANS
FOR MOUNTING THE SAME
Filed Sept. 9, 1946                                     2 Sheets-Sheet 1

Inventor
GEORGE W. SCHATZMAN

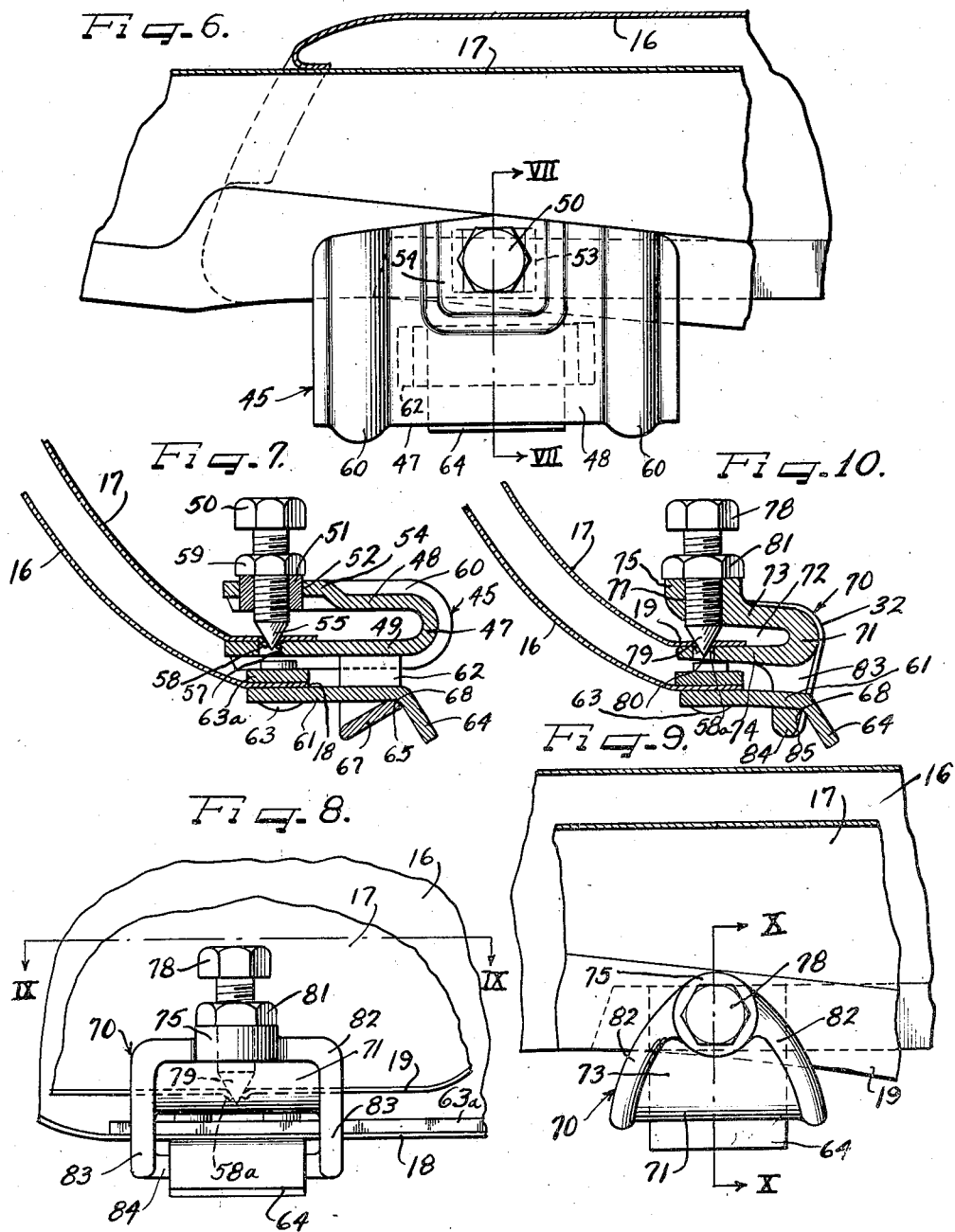

Patented June 19, 1951

2,557,147

UNITED STATES PATENT OFFICE 2,557,147

FENDER AND FENDER SHIELD ASSEMBLY AND MEANS FOR MOUNTING THE SAME

George W. Schatzman, Detroit, Mich., assignor to Houdaille-Hershey Corporation, Detroit, Mich., a corporation of Michigan Application September 9, 1946, Serial No. 695,760

14 Claims. (Cl. 280—153)

This invention relates to improvements in fender and fender shield assembly, and more particularly to novel means for mounting and securing fender shields to the fenders of automotive vehicles and the like.

In the vehicle industry, and particularly in the automobile industry, various means have been utilized to improve the appearance of vehicle fenders. Usually a fender is provided with an opening which affords access to the vehicle wheel, and which permits the ready removal or replacement of the wheel in an axial direction. Since this opening inherently presents an unattractive outward appearance, detachable fender shields have been employed substantially to cover the opening.

As the term "fender shields" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield construction in which the fender shield is mounted upon and retained in position on the fender in a novel manner.

Another object of the invention is to provide a fender shield having novel means for securing it in place removably upon a fender.

A further object of the invention is to provide improved means for use in a fender and fender shield assembly and which is readily adaptable for incorporation with an existing fender so as to function in the nature of an adapter which obviates the need for initially supplying vehicle fenders with special brackets, or other mechanism or openings for accommodating fender shields but enables the vehicle owner to equip the fenders with fender shields if and whenever he chooses to do so.

Still another object of the invention is to provide a novel fender shield mount which is in the nature of an optional and readily removable accessory.

A still further object of the invention is to provide unusually simple and inexpensive means, but which is none the less rugged and reliable in use, for supporting a fender shield in closing relation to the wheel access opening of a fender.

Yet another object of the invention is to provide improved hanger bracket structure for supporting a fender shield in place at the wheel opening of a fender.

Other objects, features and advantages of the present invention will become readily apparent from the following detailed description of certain preferred embodiments thereof taken in conjunction with the accompanying two sheets of drawings, in which:

Figure 6 is a sectional top plan view taken substantially along the line VI—VI of Figure 5;

Figure 7 is a vertical detail sectional view taken substantially in the plane of line VII—VII of Figure 6;

Figure 8 is a fragmentary inside elevational view of a fender and fender shield assembly showing a modified supporting or hanger bracket structure adapted for use on the rear end of the access opening in the fender;

Figure 9 is a sectional top plan view taken substantially along the line IX—IX of Figure 8; and Figure 10 is a vertical sectional detail view taken substantially along the line X—X of Figure 9.

Figure 1:
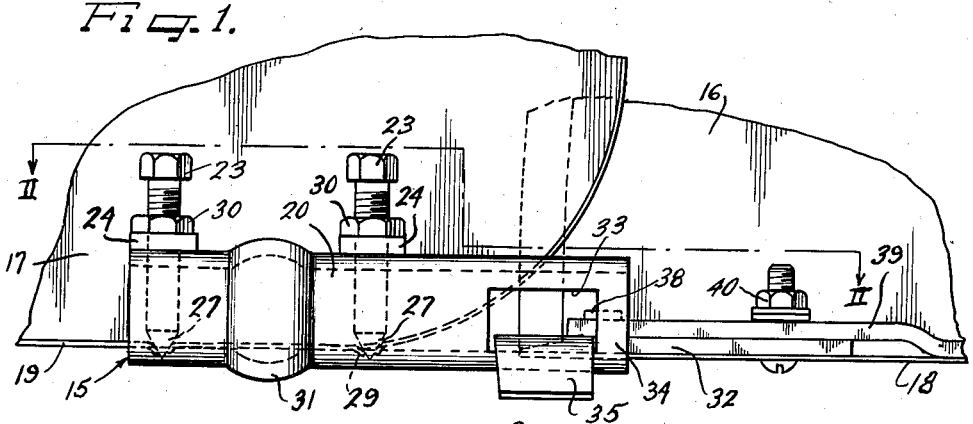
Figure 1 is a fragmentary inside elevational view of the cooperating adjacent marginal portions of a fender and a fender shield at the front end of a fender wheel opening, showing novel fender shield mounting structure embodying the features of the present invention.

Having more particular reference to the drawings, a mounting and supporting bracket structure 15 (Figs. 1 to 4) is adapted to provide support for the front end of a fender shield 16 at the customary wheel access opening in a fender 17. The fender shield 16 has a horizontal reinforcing flange 18 along its lower edge, while the fender 17 has a horizontal reinforcing flange 19 along its lower edge.

Figure 3:
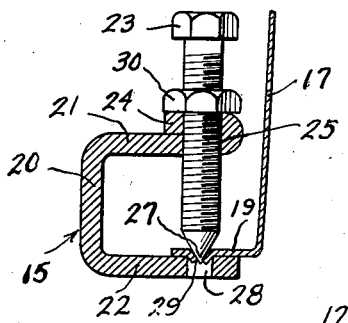
Figure 3 is a vertical sectional view taken substantially along the line III—III of Figure 2.

According to the present invention, the mounting and supporting bracket structure 15 comprises an elongated body structure 20 which is adapted to be secured optionally and adjustably to the inwardly projecting reinforcing flange 19 of the fender. To this end, the bracket body 20 is formed to receive the fender flange 19 and to be detachably secured thereto in a fixed predetermined position on the flange as determined by service requirements. In the present instance, the bracket body 20 is constructed as an elongated die-formed sheet metal member of relatively heavy gauge, 10-gauge hot rolled steel having been found suitable in practice, having a substantially C-shaped cross section to provide opposed upper and lower arm portions 21 and 22, respectively. In this manner, the bracket body is adapted to be disposed with the fender flange 19 in the mouth provided between the bracket arm portions 21 and 22, substantially as shown in Fig. 3.

Means for securing the bracket body 20 to the fender flange 19 in the present instance comprise a pair of attaching screws 23, of set screw type, threadedly carried by the upper arm 21 of the bracket and operative to secure the lower arm 22 of the bracket onto the fender flange. For this purpose, the upper bracket arm 21 has a longitudinally spaced marginal pair of return bent tabs 24 affording, together with the contiguous base portion of the arm a double thickness screw boss or base having a vertical axis tapped bore 25 through which the respective set screw 23 projects threadedly. Each of the set screws 23 is of a length to afford a substantial extent above its threaded base for free access of a manipulating wrench to the head of the screw, while the lower end portion of the screw is of such length as to present a tapered, sharpened piercing point or tip 27 providing for entry into a coaxial clearance and interlock hole 28 in the lower arm 22 of the bracket. The respective holes 28 are of smaller diameter than the principal diameter of the screws 23.

In this manner, the fender flange 19 is adapted to be interposed between the piercing tips 27 of the set screws 23 and the lower arm 22 of the bracket, serving substantially as an anvil. The screws 23 can then be driven against the fender flange until the tips 27 pierce the same which causes a burr flange 29 to be displaced and driven into the clearance holes 28 which thus serve as sockets. When the respective set screws 23 have been thoroughly tightened, that is, have been driven to the maximum extent the tapered surface of the tips 27 thereof will enter the flange 19 and drive the displacement flanges 29 into the socket holes 28 and tightly against the rims of the holes, the flange 19 is thoroughly secured or clamped to the lower arm 22. Thereby lateral or longitudinal displacement of the bracket 15 is prevented because of the anchorage within the socket holes 28 of the displacement flanges 29 which are locked therein by the two set screw tips 27. Unintentional unscrewing or loosening of the set screws 23 is prevented by lock nuts 30.

It will thus be apparent, that the supporting and mounting bracket 20 is adapted to be secured optionally at the exact position which will give optimum service satisfaction longitudinally of the flange 19, and since the bracket is self-locking and retaining on the flange, no prior provision need be made for mounting the bracket. Thus, the bracket is adapted to be applied to existing fenders as an optional or replacement accessory. However, once the bracket has been applied to the fender it forms a permanent fixture thereon capable, of course, of being removed at will by unscrewing the set screws 23.

In order to rigidify the opposing arms 21 and 22 of the bracket to withstand the driving force of the set screws 23 tending to spread the arms, a transverse medial reinforcing bead 31 is formed in the arms and the connecting web portion of the bracket body.

Means for connecting the fender shield 16 to the mounting and supporting bracket 15 comprises a bracket hook arm or connector 32 having a generally flat substantially L-shaped form in plan, the long arm thereof supported by the fender shield flange 18, with the shorter arm thereof extending inwardly adjacent the end of the fender shield for engagement within an eye 33 in a longitudinal cantilever end extension 34 integral with the bracket 15 and extending beyond the margin of the fender 17 defining the front end of the wheel access opening. At its terminus the short connecting arm of the connector 32 has a downturned hook flange 35 by which unintentional withdrawal of the connector from the bracket eye 33 is prevented. The vertical distance between the top of the short attaching arm and the tip of the hook terminal 35 is somewhat greater than the vertical dimension of the eye 33 so that the insertion or removal of the terminal from the eye requires the fender shield 16 to be tilted outwardly. Thus, while the fender shield 16 is in a vertical, assembled relation to the fender opening the hook terminal 35 coacting with the bracket extension 34 holds the fender shield against lateral displacement, while at the same time the bracket extension 34 supports the front end of the fender shield.

Figure 2:
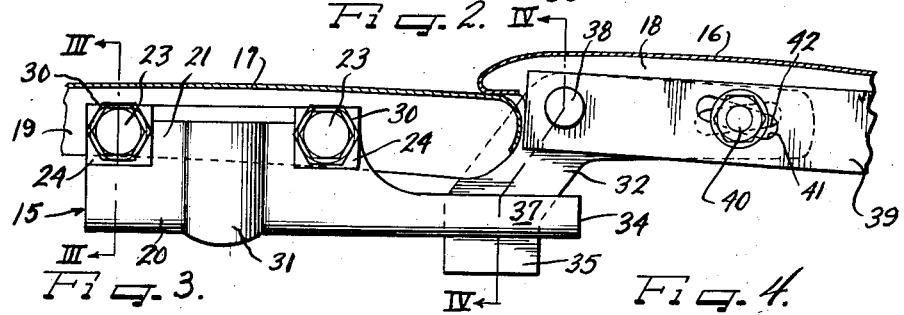
Figure 2 is a sectional top plan view taken substantially along the line II—II of Figure 1.
Figure 4:
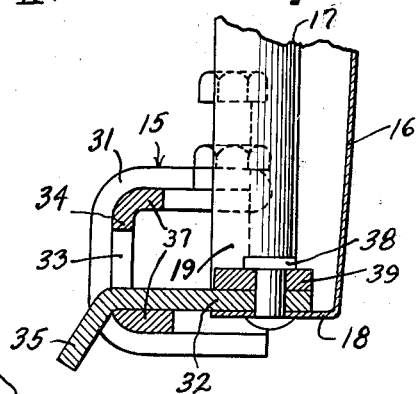
Figure 4 is a vertical sectional detail view taken substantially along the line IV—IV of Figure 2.

As best seen in Figs. 2 and 4, the eye extension 34 of the bracket 15 comprises primarily an extension of the web portion of the body 20 while the arms 21 and 22 are cut back to leave merely relatively narrow reinforcing flanges 37 for the eye extension and afford clearance for the upward sweep of the fender reinforcing flange 19 at the wheel opening. The two-screw anchorage of the bracket 15 amply resists the cantilever force imposed by the load carried by the extension 34.

By preference, the connector 32 is adjustable to swing the attaching arm thereof in a longitudinal direction for optimum service operation. This is effected by having the connector pivoted at the juncture of the long and short arms thereof as by means of a rivet 38 extending therethrough and journaled in the fender shield flange 18 and a reinforcing bar 39 carried by the flange 18 beyond the connector but offset from the flange to receive the connector therebetween. Any adjusted position of the connector 32 within certain limits is adapted to be maintained by a bolt 40 extending through coextensive oblique adjustment slots 41 in the flange 18 and the reinforcing bar 39 considered as a unit and an intersecting oblique slot 42 in the interposed arm of the connector 32. Thereby, the hook arm of the connector 32 can be swingably adjusted within the limits permitted by the oblique adjustment slots 41 and 42 and the adjustment then maintained by tightening the bolt 40.

Figure 5:
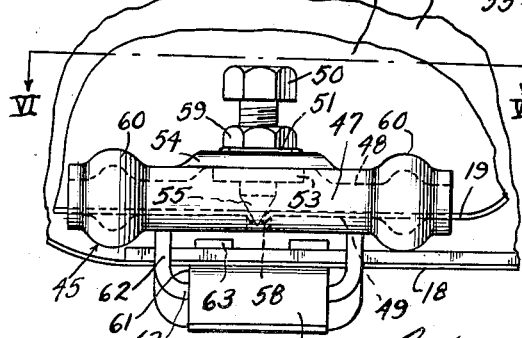
Figure 5 is an inside fragmentary elevational view of a fender and fender shield showing a form of fender shield mounting and supporting structure adapted for use at the rear end of the fender opening.

Companion to the front mounting or supporting bracket 15 is a rear mounting and supporting bracket 45 as shown in Figs. 5 to 7, inclusive. In principle, this rear bracket 35 is substantially the same as the front bracket 15 but differs therefrom in certain structural aspects to accommodate the difference in operational requirements ordinarily prevalent at the rear of the fender opening and fender shield in assembly. To this end, the bracket 45 comprises a body 47 which may conveniently be formed from a suitable relatively heavy gauge of sheet metal bent upon itself into substantially C-shape to provide upper and lower spaced arms 48 and 49, respectively, providing a mouth for the reception of the fender flange 19 therebetween for engagement by a single, marginal, centered set screw 50. To accommodate the set screw 50, the upper leg 48 is preferably equipped with a hardened, threaded insert or stationary nut 51 which has a square shank non-rotatably fitting a square aperture 52 therefor. Side limit flanges 53 on the insert 51 are received within an upwardly offset boss 54 clear of the relatively narrow space of the flange mouth of the bracket.

The set screw 50 is of such length as to extend from a good wrench-clearance distance above the stationary nut 51 to a taper-pointed piercing tip 55 extending downwardly through the flange mouth of the bracket for registration with a clearance and interlock hole 57 of smaller diameter than the set screw and coaxial therewith. This hole interlockingly receives the piercing tip 55 and a punched out burr flange 58 derived from tightening the set screw 50 piercingly against the fender flange 19 driven against the anvil provided by the lower arm 49 of the bracket. A lock nut 59 is provided to lock the set screw against unintentional loosening. To reinforce the arms 48 and 49 against spreading from the screw thrust, reinforcing ribs 60 are formed adjacent the opposite ends of the bracket body 47 inclusive of the arms 48 and 49 and the integral web portion of the body.

Mounting connection of the fender 15 with the supporting and mounting bracket 45 is effected through the medium of a centered finger hook or bracket 61 engaging in an eye or loop structure 62 depending in centered relation from the lower bracket arm 49.

Herein, the bracket finger 61 comprises an elongated bar which may be formed from the same type sheet metal as the bracket 45 and having its outer end secured as by means of rivets 63 under the fender shield flange 18 to project inwardly below the bracket 45. The inner end portion of the bracket finger 61 is preferably formed with a downwardly oblique hook terminal 64 which extends downwardly to a greater distance than the spacing between the lower bracket arm 49 and an interlocking edge 65 provided by a horizontal, inwardly upwardly tilted bar 67 of the hanger loop 62. Hence, the hanger loop edge 65 is adapted to enter into interlocking engagement within a reentrant obtusely angular groove 68 provided between the main finger portion and the hook terminal 64 to restrain lateral outward displacement of the fender shield 16 relative to the fender 17. The side arms of the hanger 62 hold the bracket and the finger 61 against displacement in the plane of the fender and shield assembly. Engagement of a reinforcing bar 63a on the fender shield flange 18 with the under edges of the reinforcing beads 60 in the full assembly holds the bracket hanger 62 and the finger 61 against rattle.

In effecting assembly of the fender shield 16 with the fender 17, the fender shield is held tilted outwardly, in the same manner as described hereinbefore for effecting assembly of the front bracket 15 and the bracket arm 32, until, like the front hook terminal 35, the rear hook terminal 64 is assembled within the eye of its hanger loop 62. Thereupon, the fender shield 16 may be tilted upwardly into engagement with the fender and the interlocked assembled relationship is thereafter maintained by the mounting and supporting brackets 15 and 45 until the fender shield is again tilted outwardly and the bracket arms or fingers 35 and 64 withdrawn from the respective bracket eyes.

By having the bracket hanger bar 67 tilted, as shown, a cam surface opposes the entering end of the hook terminal 64 to facilitate and direct entry of the same into the eye of the loop 62.

By preference, the hanger loop 62 is formed from sheet metal bent to the proper shape and having the edges thereof welded or otherwise secured to the underside of the lower bracket arm 49 adjacent to the reinforcing beads 60. If preferred, the mounting and supporting brackets 15 and 45 may be constructed as casting of suitable material such as malleable iron instead of a sheet metal stamping. A cast bracket is especially desirable for the rear mounting and supporting bracket since it enables such bracket to be made in one piece, although it will be clear, of course, that the front mounting or supporting bracket may also be cast if it is desired.

An exemplary cast rear mounting and supporting bracket 70 is shown in Figures 8 to 10 inclusive, and comprises a body 71 formed with a horizontal slot-like mouth 72 giving it a substantially C-shape with upper and lower arms 73 and 74, respectively. The upper arm 73 is formed with a central upwardly projecting boss 75 at its forward or outer end edge which is vertically bored and tapped as indicated at 77 to accommodate a set screw 78 having a taper pointed lower piercing tip 79 adapted to register with a small diameter coaxial clearance and inter-lock hole 80 in the lower leg 74. Thus, when the set screw 78 is driven through the underlying fender flange 19 received within the mouth 72, a burr flange 58a is forced from the fender flange by the piercing thereof by the piercing point 79, and the flange 58a is interlockingly wedged into the smaller diameter hole 80. A lock nut 81 is provided for locking the set screw 78 against unintentional loosening.

Reinforcing the upper leg 73 and the body 71 against spreading under the thrust influence of the tightened set screw 78 are marginal reinforcing ribs 82 which extend from the boss 75 and merge with depending legs 83 on the opposite sides of the bracket depending below the inner margin of the lower arm 74 and constructed and arranged to afford antispreading reinforcement for the lower arm 74.

The lower ends of the legs 83 are connected by a horizontal integral hanger bar 84 and adapted to be engaged by the bracket finger 61 in the same manner and for the same purpose as described in connection with the bracket 45. The hanger bar 84 affords a corner or edge 85 which interlockingly engages the finger 61 within the interlock groove 68 in the assembled relation of the fender shield with the fender.

From the foregoing it will be observed that it is characteristic of all forms of mounting and supporting brackets herein that they are readily adaptable to existing fenders and therefore the vehicle or fender manufacturer need not equip the fenders with any special bracket or bracket-receiving structure, since the brackets of the present invention have been devised for self-mounting upon the customary fender reinforcing flange in independently adjustable relationship. Once the bracket structure has been mounted it forms a relatively permanent fixture on the fender but can be readily removed if so desired. This is especially advantageous in the event the fender must be replaced, whereupon it is a simple matter to remove the bracket by loosening the one or more piercing set screws with which it is equipped, lifting the bracket away, and replacing it upon the replacement fender. The bracket structure is simple and durable in structure so that it is reasonably foolproof, especialy against overtightening of the piercing set screw, and is adapted to be applied by means of a simple wrench for turning the set screw or screws and then tightening the lock nuts.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a mounting and supporting structure for a fender and fender shield assembly, a bracket having opposed spaced portions for receiving a marginal part of the fender therebetween, and means carried by one of said portions for securing said marginal fender part against the other portion, said securing means comprising a set screw threadedly supported by one of said portions and having a conical piercing tip for engagement with the fender marginal part, said other portion having an opening coaxial with the piercing tip of the set screw and of smaller diameter than the conical shoulder of the piercing tip of the set screw to receive the piercing end of the set screw and a burr flange struck out of the fender marginal part by said piercing tip to be clamped against the margin defining said aperture by the conical shoulder of the piercing tip.

2. As an article of manufacture, a bracket structure for attachment to a fender for supporting a fender shield, said bracket structure comprising a substantially C-shaped member, means on one arm thereof engageable with the fender to secure it against the other arm, and means extending from said arms for engagement by an interengaging member on the fender shield, said means comprising an integral cantilever extension of the bracket member in one piece therewith and extending from one side edge thereof and having an eye therein for receiving the fender shield member.

3. In combination in a fender shield supporting bracket, a substantially C-shaped structure formed from sheet metal and having a portion of one arm thereof turned upon itself to afford a double thickness, said double thickness being tapped to provide a screw boss, a taper pointed piercing set screw threaded through said screw boss and adapted to register with a reduced diameter hole in the opposite arm of the bracket member and means reinforcing the arms against spreading apart under the thrust of the set screw working against the margin defining said reduced diameter hole.

4. In combination in a fender shield supporting bracket, a substantially C-shaped structure formed from sheet metal and having a portion of one arm thereof turned upon itself to afford a double thickness, said double thickness being tapped to provide a screw boss, a taper pointed piercing set screw threaded through said screw boss and adapted to register with a reduced diameter hole in the opposite arm of the bracket member, said member having reinforcing rib structure to rigidify the same against spreading from the thrust of the set screw.

5. In combination in a bracket structure for supporting a fender shield on a fender, a one-piece casting having a slot therein affording spaced arms for receiving a reinforcing flange on the fender therebetween, one of said arms having a tapped boss thereon, and the opposite arm having a hole concentric with said boss, a taper tipped piercing set screw threaded through said boss and adapted to have the piercing tip register with said hole upon piercing said fender flange for driving the fender flange against said opposite arm and interlocking the same therewith, and means providing an eye on said casting for receiving a hangar finger supported by the fender shield.

6. In combination in a bracket adapted to be secured to a fender for supporting a fender shield on the fender, the bracket comprising a pair of opposed arms having the outer ends thereof free and integrally joined together at their inner ends, an attaching device carried by one of said legs adjacent its outer end and cooperative with the outer end portion of the opposite leg for securing the margin of a fender therebetween, engagement means on the bracket disposed back of said securing means and adjacent to said integral juncture and adapted for engagement by means on a fender shield to be supported thereby, and reinforcing means extending from said one leg about the integral juncture and inwardly beyond said engagement means.

7. In combination in a bracket assembly for mounting a fender shield on a fender having a wheel access opening, the bracket having a portion of substantially U-shape arranged to be clamped to the margin of the fender at the bottom of one side of the wheel access opening with the back of the U extending inwardly, a portion of the back of the bracket projecting laterally beyond the legs of the bracket cantilever fashion to extend into the wheel access opening, said cantilever extending portion having an aperture therein, and a supporting arm arranged to be carried by a fender shield and to project inwardly from the fender shield to engage in said aperture for supporting the fender shield upon the bracket.

8. In a fender and fender shield assembly including a fender having a wheel access opening and defined about its margin by an inwardly extending marginal portion and a fender shield for closing said wheel access opening, the fender shield having an arm extending therefrom inwardly beyond said fender margin, and a bracket comprising a U-shaped one piece body portion having said fender margin therebetween, means securing said fender margin between the arms of the bracket, said bracket having a portion integral with the inner part thereof at a point clear of the fender margin and extending into intercepting relation to the fender shield arm, said bracket portion having an aperture therein defined at the lower side thereof by a generally horizontal bar upon which said fender shield arm rests to support the fender shield in place through the medium of said bracket on the fender.

9. In a fender assembly including a wheel access opening and a margin of the fender extending generally inwardly, a fender shield supporting bracket adjacent to one end of the access opening and comprising a U-shaped metal member having a set screw threaded through one leg thereof and formed with a tapered piercing tip projecting toward the opposite leg, said opposite leg having a clearance hole of smaller diameter than the shoulder of the conical piercing tip and disposed coaxial with the axis of the screw, the margin of the fender being interposed in the mouth of the U and pierced and with a burr flange driven therefrom by the piercing tip and clamped by the conical tip shoulder against the opposing margin defining said hole, an integral reinforcing rib extending across each of said legs and across the juncture between the legs and reinforcing the legs of the U against spreading under the thrust of the set screw, and a hanger extension providing a bar disposed inwardly from the mouth of the U to extend clear of and beyond the fender margin and adapted to receive a supporting arm projecting inwardly from the margin of the fender shield for supporting the fender shield.

10. In combination in a fender and fender shield assembly, a fender having a wheel access opening and a marginal flange extending inwardly adjacent to said opening, a fender closing said opening and also having an inwardly extending marginal flange underlying a portion of the fender flange, a generally U-shape bracket having an outwardly opening mouth within which the fender flange is interposed, means securing said fender flange fixedly within said mouth, an integral hanger structure extending from the bracket rearwardly of said mouth and projecting clear of the fender flange, said hanger structure including a substantially straight horizontal bar extending substantially parallel to the fender, and a flat horizontally arranged arm supported by the fender shield flange and extending inwardly and resting upon the hanger bar, said arm having a downturned retaining flange engaging at the inner side of said bar to prevent outward withdrawal of the arm in the fully assembled relation of the fender shield with the fender.

11. In a fender and fender shield assembly including a fender having an inturned marginal flange and a fender shield having an inwardly extending supporting arm arranged to project past said flange in the assembly, a bracket structure for attachment to said inturned flange for receiving said inwardly extending supporting arm, said bracket structure comprising a substantially C-shaped body providing a mouth receptive of the fender flange, means on one arm of the bracket body to secure the fender flange against the other arm, and a portion on the bracket body extending from adjacent juncture of said arms and providing a hanger bar disposed substantially rearwardly from said mouth for engagement by the fender shield supporting arm at a point substantially inwardly of the fender flange.

12. A fender shield supporting bracket comprising a one piece metallic bracket member of generally U-shape cross section defining a pair of substantially parallel arms providing a mouth therebetween receptive of a marginal flange of a fender and having a connecting web at the rear of the mouth, means extending from one of said arms for cooperation with the other of said arms to secure the fender flange therebetween in mounting the bracket upon the fender, and a cantilever extension of said web extending to one side of said securing means and having an opening therein defined at its lower side by a hanger bar formation receptive of a supporting arm on a fender shield.

13. A fender shield supporting bracket comprising a one piece metallic bracket member of generally U-shape cross section defining a pair of substantially parallel arms providing a mouth therebetween receptive of a marginal flange of a fender and having a connecting web at the rear of the mouth, means extending from one of said arms for cooperation with the other of said arms to secure the fender flange therebetween in mounting the bracket upon the fender, and a cantilever extension of said web extending to one side of said securing means and having an opening therein defined at its lower side by a hanger bar formation receptive of a supporting arm on a fender shield, said securing means comprising a spaced pair of attaching set screws affording a steady connection mutually cooperative to resist cantilever force on said extension.

14. A fender shield supporting bracket comprising a one piece metallic bracket member of generally U-shape cross section defining a pair of substantially parallel arms providing a mouth therebetween receptive of a marginal flange of a fender and having a connecting web at the rear of the mouth, means extending from one of said arms for cooperation with the other of said arms to secure the fender flange therebetween in mounting the bracket upon the fender, and a cantilever extension of said web extending to one side of said securing means and having an opening therein defined at its lower side by a hanger bar formation receptive of a supporting arm on a fender shield, said securing means comprising a spaced pair of attaching set screws affording a steady connection mutually cooperative to resist cantilever force on said extension, and said arms and said web having an integral reinforcing rib thereon intermediate said screws to resist the thrust of said screws tending to spread the arms apart.

GEORGE W. SCHATZMAN.

REFERENCES CITED

The following references are of record in the file of this patent:

UNITED STATES PATENTS

| Number | Name | Date |
|---|---|---|
| 1,233,223 | Hachmann | July 10, 1917 |
| 1,600,665 | Cocks | Sept. 21, 1926 |
| 1,794,976 | Mueller | Mar. 3, 1931 |
| 1,946,967 | Douglas | Feb. 13, 1934 |
| 1,954,919 | Carey | Apr. 17, 1934 |
| 2,080,261 | Funk | May 11, 1937 |
| 2,239,373 | Schatzman et al. | Apr. 22, 1941 |
| 2,273,523 | Jandus | Feb. 17, 1942 |
| 2,278,121 | Berluti | Mar. 31, 1942 |
| 2,312,536 | Fergueson | Mar. 2, 1943 |

FOREIGN PATENTS

| Number | Country | Date |
|---|---|---|
| 833,177 | France | July 18, 1938 |